US007338983B2

(12) United States Patent
Simpson et al.

(10) Patent No.: US 7,338,983 B2
(45) Date of Patent: Mar. 4, 2008

(54) LOW DENSITY POLYURETHANE FOAM, METHOD OF PRODUCING, AND ARTICLES COMPRISING THE SAME

(75) Inventors: Scott S. Simpson, Woodstock, CT (US); Tadashi Sato, Inazawa (JP)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 11/200,536

(22) Filed: Aug. 9, 2005

(65) Prior Publication Data

US 2006/0025493 A1   Feb. 2, 2006

Related U.S. Application Data

(63) Continuation-in-part of application No. 11/054,620, filed on Feb. 9, 2005.

(51) Int. Cl.
*C08J 9/08* (2006.01)
(52) U.S. Cl. ............... 521/170; 428/304.4; 428/423.1; 521/124; 521/125; 521/130; 521/131; 521/174; 521/176
(58) Field of Classification Search .............. 521/124, 521/125, 130, 131, 170, 174, 176; 428/304.4, 428/423.1
See application file for complete search history.

(56) References Cited

U.S. PATENT DOCUMENTS

| | | | |
|---|---|---|---|
| 2,591,884 A | 4/1952 | Simon et al. |
| 2,602,783 A | 7/1952 | Simon et al. |
| 2,621,166 A | 12/1952 | Schmidt et al. |
| 2,698,838 A | 1/1955 | Simon et al. |
| 2,729,618 A | 1/1956 | Müller et al. |
| 2,779,689 A | 1/1957 | Reis, Jr. |
| 2,808,391 A | 10/1957 | Pattison |
| 2,811,493 A | 10/1957 | Simon et al. |
| 2,833,730 A | 5/1958 | Barthel, Jr. |
| 2,834,748 A | 5/1958 | Bailey et al. |
| 2,846,458 A | 8/1958 | Haluska |
| 2,850,476 A | 9/1958 | Seeger et al. |
| 2,866,762 A | 12/1958 | Brochhagen et al. |
| 2,866,774 A | 12/1958 | Price |
| 2,868,824 A | 1/1959 | Haluska |
| 2,870,097 A | 1/1959 | Brayton |
| 2,877,212 A | 3/1959 | Seligman |
| 2,878,601 A | 3/1959 | Burmeister et al. |
| 2,902,473 A | 9/1959 | Smith |
| 2,911,390 A | 11/1959 | Smith |
| 2,917,480 A | 12/1959 | Bailey et al. |
| 2,921,915 A | 1/1960 | Brochhagen et al. |
| 2,962,524 A | 1/1960 | Hostettler et al. |
| 3,021,309 A | 2/1962 | Cox et al. |
| 3,021,317 A | 2/1962 | Cox et al. |
| 3,057,901 A | 10/1962 | Plueddemann |
| 3,169,945 A | 2/1965 | Hostettler et al. |
| 3,383,351 A | 5/1968 | Stamberger |
| 3,772,224 A | 11/1973 | Marlin et al. |
| 3,821,130 A | 6/1974 | Barron et al. |
| 3,849,156 A | 11/1974 | Marlin et al. |
| 3,862,879 A | 1/1975 | Barron et al. |
| 3,947,386 A | 3/1976 | Prokai et al. |
| 4,022,722 A | 5/1977 | Prokai et al. |
| 4,087,389 A | 5/1978 | Coppola |
| 4,275,172 A | 6/1981 | Barth et al. |
| 4,374,209 A | 2/1983 | Rowlands |
| 4,412,962 A | 11/1983 | Bessette et al. |
| 5,194,453 A | 3/1993 | Jourquin et al. |
| 5,234,965 A | 8/1993 | Gott et al. |
| 5,491,174 A | 2/1996 | Grier et al. |
| 5,665,785 A | 9/1997 | McClellan et al. |
| 5,728,745 A | 3/1998 | Allen et al. |
| 5,733,945 A | 3/1998 | Simpson |
| 5,770,635 A * | 6/1998 | Lee et al. ................. 521/129 |
| 5,798,533 A * | 8/1998 | Fishback et al. ......... 252/182.25 |
| 5,817,860 A | 10/1998 | Rizk et al. |
| 5,834,527 A | 11/1998 | Sulzbach |

(Continued)

FOREIGN PATENT DOCUMENTS

EP          1 189 963          3/2002

(Continued)

OTHER PUBLICATIONS

JP 2001-100216; Publication Date Apr. 13, 2001; (translation of abstract only).

(Continued)

*Primary Examiner*—John M. Cooney, Jr.
(74) *Attorney, Agent, or Firm*—Cantor Colburn LLP

(57) ABSTRACT

A method for producing a cured, low-density polyurethane foam, the method comprises frothing a reactive polyurethane-forming composition comprising an isocyanate-containing component, an active hydrogen-containing component reactive with the isocyanate-containing component, a blowing agent, a surfactant, and catalyst system, wherein the catalyst system provides for a delayed curing of the foam; casting the frothed reactive polyurethane-forming composition onto a first carrier; placing a second carrier on a side of the cast foam opposite the first carrier; blowing the froth with the second carrier in place; and curing the blown froth so as to provide a polyurethane foam layer having a density of about 50 to about 400 kg/m$^3$ and a thickness of about 0.3 to about 13 mm. The foams are useful as sealing members.

19 Claims, 5 Drawing Sheets

U.S. PATENT DOCUMENTS

| | | | |
|---|---|---|---|
| 5,859,081 | A | 1/1999 | Duffy |
| 5,968,995 | A | 10/1999 | Rizk et al. |
| 6,025,405 | A | 2/2000 | Snell Tung et al. |
| 2001/0000252 | A1 | 4/2001 | Kazmierski et al. |

FOREIGN PATENT DOCUMENTS

| | | |
|---|---|---|
| EP | 1564451 A2 | 8/2005 |
| GB | 733 624 | 7/1955 |
| JP | 53-8735 | 3/1978 |
| WO | WO 99/57184 | 11/1999 |
| WO | WO 00/73362 | 12/2000 |

OTHER PUBLICATIONS

Poron® Cellular Urethane Foams, Standard Industrial Materials Typical Physical Properties, Product Brochure—Rogers Corporation, Woodstock, CT, 2000-019-6.OF, Pub. #17-034, Sep. 1998.

European Search Report; European Application No. 05017317.8; Dated Jun. 13, 2006.

\* cited by examiner

LOW DENSITY POLYURETHANE FOAM, METHOD OF PRODUCING, AND ARTICLES COMPRISING THE SAME

CROSS REFERENCE TO RELATED APPLICATION

This application is a continuation-in-part of U.S. application Ser. No. 11/054,620 filed Feb. 9, 2005, which claims priority from Japanese Application No. 2004-034059, filed Feb. 10, 2004.

BACKGROUND

This invention relates to low-density polyurethane foams and methods of manufacture thereof, as well as articles formed using low-density polyurethane foams. The foams are of particular utility in the manufacture of a sealing member, especially a sealing member suitable for being disposed between the margin of a liquid crystal display screen in the display of portable, telecommunication equipment such as a portable telephone or the margin of a microphone or the like and the internal surface of a case thereof.

Within electrical machinery and apparatus such as a television set, a computer, a portable telephone, or a display of a personal digital assistant, an internal apparatus such as a liquid crystal display, a microphone or a speaker is generally arranged such that the internal apparatus faces the outside of its casing. Use of a sealing member between the edge of the internal apparatus and the casing improves dust control, prevents leaking of light from a backlight and the like, and the prevention impact damage.

For many applications, including small devices exemplified by recent portable telephones, an increase and sophistication in function and a decrease in weight have been desired. Based on this, a performance requirement for the sealing member above has become more sophisticated. For example, the above increase and sophistication in function for recent portable telephones have been carried out by attaining an increase in the integration of parts via unification of the IC size to be used, the saving of space by introducing a very large-scale integration (VLSI), and the multi-layering of a substrate. When many parts are integrated within the casing of a portable telephone as described above, the internal structure thereof, for example, the interlocking structure of the casing becomes more complicated. Gaps between the internal parts and the casing can form, requiring a sealing member arranged between the internal parts and the casing. Sealing members must, however, be able to provide an adequate seal at a wide range of compression ratios (from low to high), corresponding to variations in the gap size to be filled.

Generally the sealing properties of a sealing member are evaluated as to whether the sealing member is easily deformed by a load or not. Therefore, in order to have adequate sealing properties when the sealing member is highly compressed, a low-density soft polyurethane foam, an olefin foam such as polyethylene foam or polypropylene foam, or a rubber foam, or the like is used. However, soft, thin foams are often obtained by slicing sheets of the required thinness after the foam has been obtained in the form of a slab. Such foams thus have no skin layer and poor adhesive properties. Soft foams therefore are not as dust-proof or as light-blocking as might be desired. Foams having a skin layer can be also produced from the above raw materials, but the compressive residual strain of such sealing members is large, and the foams do not have stable sealing properties over time. Furthermore, since such foams have a large cellular diameter, it causes problems in dust-proof performance and light-blocking performance.

In addition, the casings of various electrical machinery and apparatuses use lightweight and high-strength material of generally high conductivity, for example, magnesium alloys or the like. In order to effectively avoid disadvantages such as the generation of electromagnetic waves based on this, sealing materials having a lower dielectric constant, i.e., materials having high insulating properties are desired. However, since the dielectric constant is essentially a material-intrinsic value, it is difficult to select a material having both sealing properties and a low relative dielectric constant.

Japanese Patent Laid-Open Publication No. 2001-100216 specifically discloses a polyurethane foam as a sealing member. This polyurethane foam is formed according to a mechanical froth method, and easily deformed with a low load at a 25% compression. A plastic film as a back-up material is integrally formed on a single side of the foam. In the mechanical frothing method, polyurethane foams are formed by mixing an organic isocyanate component, an active hydrogen-containing component(s), a surfactant, and a catalyst, then dispersing an inert gas throughout the mixture by mechanical beating of the mixture to form a heat curable froth. The froth is then cured to form the foam.

Polyurethane foams can also be formed by physical or chemical blowing of the isocyanate component, active hydrogen-containing component mixture, and other additives, followed by subsequent curing. Each of these methods of foam production has a number of drawbacks, especially when thin polyurethane foam sections having a low and uniform density across the entire cross-section are required. For example, foams made by mechanically frothing a polyurethane liquid phase using air or inert gas often have a uniform cell structure with good physical properties. However, such foams also have an undesirably high density, on the order of greater than 15 pounds per cubic foot (pcf) (240 kilogram per cubic meter ($kg/m^3$)). The foams are also very difficult to manufacture in thicknesses of example less than 0.5 inches (13 millimeters (mm)), preferably less than 0.2 inches (5 mm), and particularly less than 0.12 inches (3 mm). On the other hand, foams made by physical or chemical blowing can have very low cell densities, on the order of 2 pcf (32 $kg/m^3$), but also have irregular cell structure. Thin sections made in this manner often have poor physical properties.

In view of these drawbacks, there exists a need in the art for soft foams having a thickness less than 0.5 inches (13 mm), preferably less than 0.12 inches (3 mm) and low densities, on the order of up to 25 pcf (up to 400 $kg/m^3$), preferably 3 to 15.6 pcf (50 to 250 $kg/m^3$), together with uniform cell structure.

SUMMARY

In order to overcome the problems described above and to accomplish the desired objects, an article comprises a foamed polyurethane sheet having a density of about 100 to about 250 $kg/m^3$, in which the sheet is formed by reacting and curing a polyurethane-foam raw material having about 100% by volume of a resin raw material and about 300% by volume or more of a foam-forming gas mixed therewith, the foamed polyurethane sheet having a compression load deflection at 50% in the range of about 0.003 to about 0.025 MPa, and the compression load deflection at 75% thereof being in the range of about 0.02 to about 0.40 Mpa, wherein the resin raw material contains polyol and isocyanate as a main raw material and a foam stabilizer as an auxiliary material.

A method of producing an article, for example a sealing member, according to another embodiment comprises supplying a resin raw material containing polyol and isocyanate as a main raw material and a foam stabilizer as an auxiliary material; feeding a polyurethane foam raw material having about 100% by volume of the resin raw material and about 300% by volume or more of a foam-forming gas mixture, onto a substrate film; controlling the thickness of the polyurethane foam raw material to be within a range of about 0.3 to about 3.0 mm; and promoting the reaction and curing of the polyurethane foam raw material so as to produce a foamed polyurethane sheet comprising a polyurethane-foam having a thickness in the range of about 0.3 to about 3.0 mm, a density of about 100 to about 250 kg/m$^3$, a compression load deflection at 50% in a range of about 0.003 to about 0.025 MPa, and a compression load deflection at 75% in a range of about 0.02 to about 0.40 MPa.

In another embodiment, a method for producing an improved low-density polyurethane foam having a thickness less than about 13 mm comprises frothing a mixture comprising an isocyanate component, an active hydrogen-containing component reactive with the isocyanate component, a blowing agent, and a catalyst system, wherein the catalyst system provides for delayed curing of the foam; casting the frothed mixture onto a first carrier; contacting the cast mixture with a second carrier on a side opposite the first carrier; physically or chemically blowing the frothed mixture in the presence of the second carrier; and curing the blown frothed mixture to provide a foam having a thickness of about 0.3 to about 13 mm, a density less than about 25 pcf (400 kg/m$^3$) and a uniform cell structure throughout the foam.

In another embodiment, an article comprises the above-described frothed and blown foam.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

A polyurethane foam layer suitable for use as, for example, a sealing member and a method of producing the same according to the present invention will be now hereinafter explained with preferred examples enumerated with reference to attached drawings. The inventors of the present application has found the following: when a polyurethane layer is produced according to a mechanical froth method, increasing the amount of a foam-forming gas for forming a cell decreases the density of the sealing member. Such foams are soft even when highly compressed, allowing sufficient sealing properties even for small gaps, for example those found at an interlocking portion of a casing in a device such as a portable telephone.

Figure 1:
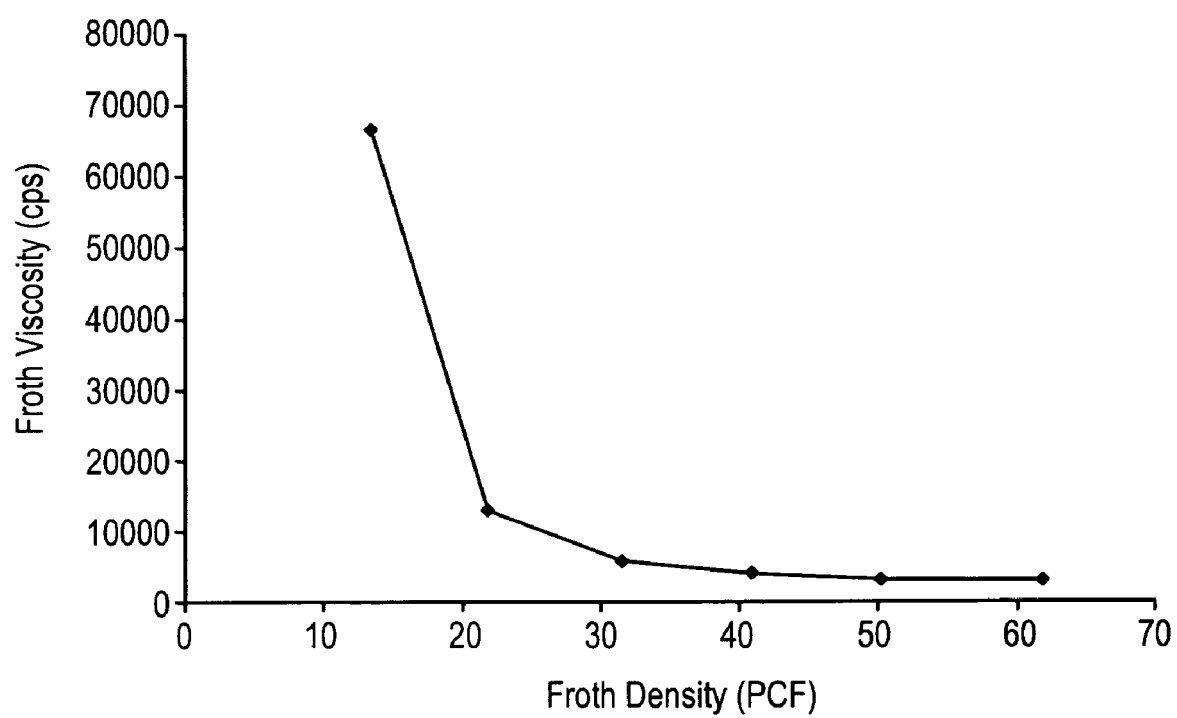
FIG. 1 is a graph showing the relationship between froth viscosity and froth density.

With respect to the reactive mixture prepared using the mechanical frothing method, the following two points were experimentally determined. First, it was observed that when the amount of a foam-forming gas is increased, the apparent viscosity of the polyurethane-foam raw material is increased. In other words, as illustrated in FIG. 1, froth viscosity increases exponentially at lower froth densities. This causes a number of difficulties in casting and curing the froth. For example, when the thickness of the cast froth is controlled by contact with a roller or the like, the froth is not easily released from the roller, whereby the surface of the froth that comes into contact with the roller is coarsened. Secondly, it has been observed that when a foamed polyurethane sheet having a low density is produced, the thinner the sheet, the coarser the surface of the foamed polyurethane sheet becomes.

Thus, in order to avoid this phenomenon, a sheet of material having a smooth surface for controlling the thickness of a polyurethane-foam raw material is used, thereby allowing a foam with a good surface profile to be obtained.

In the alternative, or in addition, it has been found that use of a two-step frothing/blowing process further allows ready production of very thin, low-density polyurethane foams. This method comprises mechanically frothing a polyurethane liquid phase containing a suitable blowing agent, casting the froth onto a first (bottom) carrier, and subsequently blowing and curing the cast froth under a second (top) carrier. The catalyst system is selected so as to allow delayed curing of the froth, such that the blowing is substantially completed before curing takes place. The foam has been found to have uniform cell structure. The foam may also have improved mechanical properties.

Figure 2:
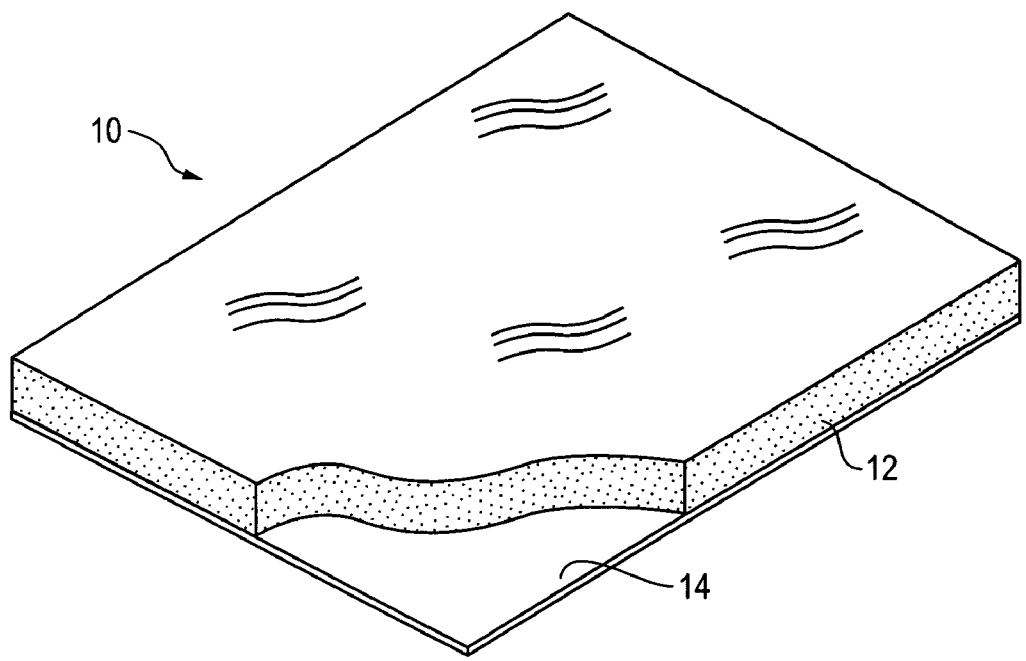
FIG. 2 is a schematic perspective view showing a preferred embodiment of a sealing member in accordance with the present invention, wherein a part of the sealing member has been cut away.

The polyurethane foams described herein can be used in a number of commercial applications, such as in sealing applications and cell phone gaskets. As shown in FIG. 2, for example, a sealing member 10 essentially comprises a foamed polyurethane layer 12 and a substrate film 14, the foamed polyurethane layer 12 providing required cushioning properties, flexibility, and the sealing properties mentioned above, the substrate film 14 being bonded on one side of this foamed polyurethane sheet 12 and enhancing the structural strength of the sealing member 10. This foamed polyurethane layer 12 is produced according to a mechanical froth method as described below.

In general, polyurethane foams are formed from reactive compositions comprising an organic isocyanate component reactive with an active hydrogen-containing component(s), a surfactant, and a catalyst. The organic isocyanate components used in the preparation of polyurethane foams generally comprises polyisocyanates having the general formula: $Q(NCO)_i$, wherein i is an integer having an average value of greater than two, and Q is an organic radical having a valence of i. Q can be a substituted or unsubstituted hydrocarbon group (i.e., an alkane or an aromatic group of the appropriate valency). Q can be a group having the formula $Q^1$-Z-$Q^1$ wherein $Q^1$ is an alkylene or arylene group and Z is —O—, —O-$Q^1$-S, —CO—, —S—, —S-$Q^1$-S—, —SO— or —$SO_2$—. Examples of suitable isocyanates include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4', 4''-triisocyanate, isopropylbenzene-alpha-4-diisocyanate, and polymeric isocyanates such as polymethylene polyphenylisocyanate.

Q can also represent a polyurethane radical having a valence of i, in which case $Q(NCO)_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of about 30 percent to about 200 percent stoichiometric excess, the stoichiometry being based upon equivalents of isocyanate group per equivalent of hydroxyl in the polyol. The amount of polyisocyanate employed will vary slightly depending upon the nature of the polyurethane being prepared.

The active hydrogen-containing component may comprise polyether polyols and polyester polyols. Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, and castor oil polyols. Suitable dicarboxylic acids and derivatives of dicarboxylic acids which are useful for producing polycondensation polyester polyols are aliphatic or cycloaliphatic dicarboxylic acids such as glutaric, adipic, sebacic, fumaric and maleic acids; dimeric acids; aromatic dicarboxylic acids such as phthalic, isophthalic and terephthalic acids; tribasic or higher functional polycarboxylic acids such as pyromellitic acid; as well as anhydrides and second alkyl esters, such as maleic anhydride, phthalic anhydride and dimethyl terephthalate.

Additional active hydrogen-containing components are the polymers of cyclic esters. The preparation of cyclic ester polymers from at least one cyclic ester monomer is well documented in the patent literature as exemplified by U.S. Pat. Nos. 3,021,309 through 3,021,317; 3,169,945; and 2,962,524. Suitable cyclic ester monomers include but are not limited to δ-valerolactone; ε-caprolactone; zeta-enantholactone; the monoalkyl-valerolactones, e.g., the monomethyl-, monoethyl-, and monohexyl-valerolactones. In general the polyester polyol may comprise caprolactone based polyester polyols, aromatic polyester polyols, ethylene glycol adipate based polyols, and mixtures comprising any one of the foregoing polyester polyols. Polyester polyols made from ε-caprolactones, adipic acid, phthalic anhydride, terephthalic acid or dimethyl esters of terephthalic acid are generally preferred.

The polyether polyols are obtained by the chemical addition of alkylene oxides, such as ethylene oxide, propylene oxide and mixtures thereof, to water or polyhydric organic components, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl] propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Propylene oxide and mixtures of propylene oxide with ethylene oxide are preferred. The polyols listed above can be used per se as the active hydrogen component.

A preferred class of polyether polyols is represented generally by the following formula: $R[(OCH_nH_{2n})_zOH]_a$ wherein R is hydrogen or a polyvalent hydrocarbon radical; a is an integer (i.e., 1 or 2 to 6 to 8) equal to the valence of R, n in each occurrence is an integer from 2 to 4 inclusive (preferably 3) and z in each occurrence is an integer having a value of 2 to 200, preferably 15 to 100. The preferred polyether polyol comprises a mixture of one or more of dipropylene glycol, 1,4-butanediol, and 2-methyl-1,3-propanediol, and the like.

Another type of active hydrogen-containing materials which can be utilized are polymer polyol compositions obtained by polymerizing ethylenically unsaturated monomers in a polyol as described in U.S. Pat. No. 3,383,351, the disclosure of which is incorporated herein by reference. Suitable monomers for producing such compositions include acrylonitrile, vinyl chloride, styrene, butadiene, vinylidene chloride and other ethylenically unsaturated monomers as identified and described in the above-mentioned U.S. patent. Suitable polyols include those listed and described hereinabove and in U.S. Pat. No. 3,383,351. The polymer polyol compositions can contain from greater than or equal to 1, preferably greater than or equal to 5, and more preferably greater than or equal to 10 wt % monomer polymerized in the polyol where the weight percent is based on the total amount of polyol. It is also generally desirable for the polymer polyol compositions to contain less than or equal to 70, preferably less than or equal to 50, more preferably less than or equal to 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates and azo compounds.

The active hydrogen-containing component may also contain polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, 2,621,166 and 3,169,945); hydroxymethyl-terminated perfluoromethylenes (U.S. Pat. Nos. 2,911,390 and 2,902,473); hydroxyl-terminated polyalkylene ether glycols (U.S. Pat. No. 2,808,391; British Pat. No. 733,624); hydroxyl-terminated polyalkylenearylene ether glycols (U.S. Pat. No. 2,808,391); and hydroxyl-terminated polyalkylene ether triols (U.S. Pat. No. 2,866,774).

The polyols can have hydroxyl numbers that vary over a wide range. In general, the hydroxyl numbers of the polyols, including other cross-linking additives, if employed, can be about 28 to about 1000, and higher, preferably about 100 to about 800. The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives. The hydroxyl number can also be defined by the equation:

$$OH = \frac{56.1 \times 1000 \times f}{M.W.}$$

wherein OH is the hydroxyl number of the polyol, f is the average functionality, that is the average number of hydroxyl groups per molecule of polyol, and M.W. is the average molecular weight of the polyol.

When used, a wide variety of blowing agent or mixture of blowing agents can be employed in the reactive compositions, including chemical and/or physical blowing agents. Chemical blowing agents include, for example, water, and chemical compounds that decompose with a high gas yield under specified conditions, for example within a narrow temperature range. The decomposition products formed during the decomposition process are preferably physiologically safe, and do not significantly adversely effect the thermal stability or mechanical properties of the foamed polyurethane sheets. In addition, it is preferred that the decomposition products not effloresce or have a discoloring effect on the foam product.

Suitable chemical blowing agents include water. It is generally desirable to control the curing reaction by selectively employing catalysts when water is used as the blowing agent. Water is generally used as a blowing agent in an amount of about 0.1 to about 8 wt. % of the total reactive composition. Other chemical blowing agents may be used, such as azo compounds, for example, azoisobutyronitrile, azodicarbonamide (i.e. azo-bis-formamide) and barium azodicarboxylate; substituted hydrazines, for example, diphenylsulfone-3,3'-disulfohydrazide, 4,4'-hydroxy-bis-(benzenesulfohydrazide), trihydrazinotriazine or aryl-bis-(sulfohydrazide); semicarbazides, for example, p-tolylene sulfonyl semicarbazide or 4,4'-hydroxy-bis-(benzenesulfonyl semicarbazide); triazoles, for example, 5-morpholyl-1,2,3,4-thiatriazole; and N-nitroso compounds, for example, N,N'-dinitrosopentamethylene tetramine or N,N-dimethyl-N,N'-dinitrosophthalmide; benzoxazines, for example, isatoic anhydride; or mixtures such as, for example, sodium carbonate/citric acid mixtures. The amount of the foregoing blowing agents will vary depending on the agent and the desired foam density, and is readily determinable by one of ordinary skill in the art. In general, these blowing agents are used in an amount of about 0.1 to about 10 wt. % of the total reactive composition.

Physical blowing agents may also be used, alone or as mixtures with each other or with one or more chemical blowing agents. Physical blowing agents can be selected from a broad range of materials, including hydrocarbons, ethers, esters and partially halogenated hydrocarbons, ethers and esters, and the like. Typical physical blowing agents have a boiling point between about −50° C. and about 100° C., and preferably between about −50° C. and about 50° C. Exemplary physical blowing agents include the CFC's (chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the FC's (fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the FE's (fluoroethers) such as methyl-1,1,1-trifluoroethylether and difluoromethyl-1,1,1-trifluoroethylether; and hydrocarbons such as n-pentane, isopentane, and cyclopentane. As with the chemical blowing agents, the physical blowing agents are used in an amount sufficient to give the resultant foam the desired bulk density. Typically, physical blowing agents are used in an amount of about 5 to about 50% by weight of the reactive composition, typically about 10 to about 30% by weight of the reactive composition. In one embodiment, water is used as the blowing agent along with one or more physical blowing agents.

A number of the catalysts conventionally used to catalyze the reaction of the isocyanate component with the active hydrogen-containing component can be employed in the foam preparation. Such catalysts include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, 1,3,5-tris (N,N-dimethylaminopropyl)-s-hexahydrotriazine, o- and p-(dimethylaminomethyl) phenols, 2,4,6-tris(dimethylaminomethyl) phenol, N,N-dimethylcyclohexylamine, pentamethyldiethylenetriamine, 1,4-diazobicyclo [2.2.2] octane, N-hydroxyl-alkyl quaternary ammonium carboxylates and tetramethylammonium formate, tetramethylammonium acetate, tetramethylammonium 2-ethylhexanoate and the like, as well as compositions comprising any one of the foregoing catalysts.

Metal acetyl acetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine)diacetyl acetylacetonato nickel, and the like. Ferric acetylacetonate (FeAA) is particularly preferred, due to its relative stability, good catalytic activity, and lack of toxicity.

Added to the metal acetyl acetonate is acetyl acetone (2,4-pentanedione), as disclosed in commonly assigned U.S. Pat. No. 5,733,945 to Simpson, which is incorporated herein by reference. The acetyl acetone provides heat latency, which allows time for the required mixing, casting and other procedures, and avoids deleterious premature curing during low temperature processing. However, as the material is cured in several heating zones and the temperature of the urethane mixture rises, the acetyl acetone is driven off. With the acetyl acetone removed together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set. In general, the ratio of metal acetyl acetonate to acetyl acetone is about 2:1 on a weight basis.

The amount of catalyst present in the reactive composition is preferably about 0.03 wt % to about 3.0 wt %, based on the weight of the active hydrogen-containing component.

In one embodiment, when water is used as the blowing agent, FeAA is selected as the catalyst. Other catalysts or adjuvants, e.g., amines, can be used to adjust the relative reaction rates of water and urethane. The water reacts with the isocyanate releasing $CO_2$. The FEAA with acetylacetone simultaneously catalyzes the curing reaction in a delayed fashion, which prevents premature curing and therefore allows the chemical (and optionally physical) blowing to continue unhindered. The catalyst eventually permits a full cure of the polyurethane foam. The metal acetylacetonate is most conveniently added by predissolution in a suitable solvent such as dipropylene glycol or other hydroxyl containing components which will then participate in the reaction and become part of the final product.

A wide variety of surfactants may be used for purposes of stabilizing the polyurethane foam before it is cured, including mixtures of surfactants. Organosilicone surfactants are especially useful. A preferred organosilicone surfactant is a copolymer consisting essentially of $SiO_2$ (silicate) units and $(CH_3)_3SiO_{0.5}$ (trimethylsiloxy) units in a molar ratio of silicate to trimethylsiloxy units of about 0.8:1 to about 2.2:1, preferably about 1:1 to about 2.0:1. Another preferred organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valences of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages. Additionally, conventional organopolysiloxane-polyoxyalkylene block copolymers such as those described in U.S. Pat. Nos. 2,834,748, 2,846,458, 2,868,824, 2,917,480 and 3,057,901 can be employed. The amount of the organosilicone polymer used as a foam stabilizer can vary over wide limits, e.g., 0.5 wt % to 10 wt % parts or greater based on the amount of the active hydrogen component. Preferably, the amount of organosilicone copolymer present in the foam formulations varies about 1.0 wt % to about 6.0 wt % on the same basis.

Other, optional additives may be added to the polyurethane froth mixture in the manufacturing process. For example, conventionally used additives such as fillers (alumina trihydrate, silica, talc, calcium carbonate, clay, and the like), dyes, pigments (for example titanium dioxide and iron oxide), antioxidants, antiozonants, flame retardants, UV stabilizers, conductive fillers, conductive polymers and the like can also be used.

In one embodiment, a reactive composition for producing a foam in accordance with the present invention is essentially in accordance with the contents disclosed in Japanese Patent Publication No. Sho 53-8735. However, in order to provide each of the density and the relative dielectric constant to the range described herein, a specific polyol composition is preferred. The polyol desirably used has a repeated unit (referred to as "Unit") of each of PO (propylene oxide) and/or PTMG (tetrahydrofuran subjected to ring-opening polymerization) or the like, except EO (ethylene oxide; $(CH_2CH_2O)_n$). This is because when a polyol including an EO Unit in a large amount is used, the resultant foam is provided with hygroscopic properties, and the relative dielectric constant of the foam is increased. Specifically, the prescribed relative dielectric constant described herein can be attained by setting the percentage of an EO Unit (or an EO Unit ratio) in a polyol to about 20% or less. For example, when a polyol to be used merely consists of a PO-Unit and an EO Unit, this polyol is set to be within the range of [the PO Unit]:[the EO Unit]=100:0 to about 80:20. In the present invention, the percentage of an EO Unit is referred to as "EO content".

Figure 3:
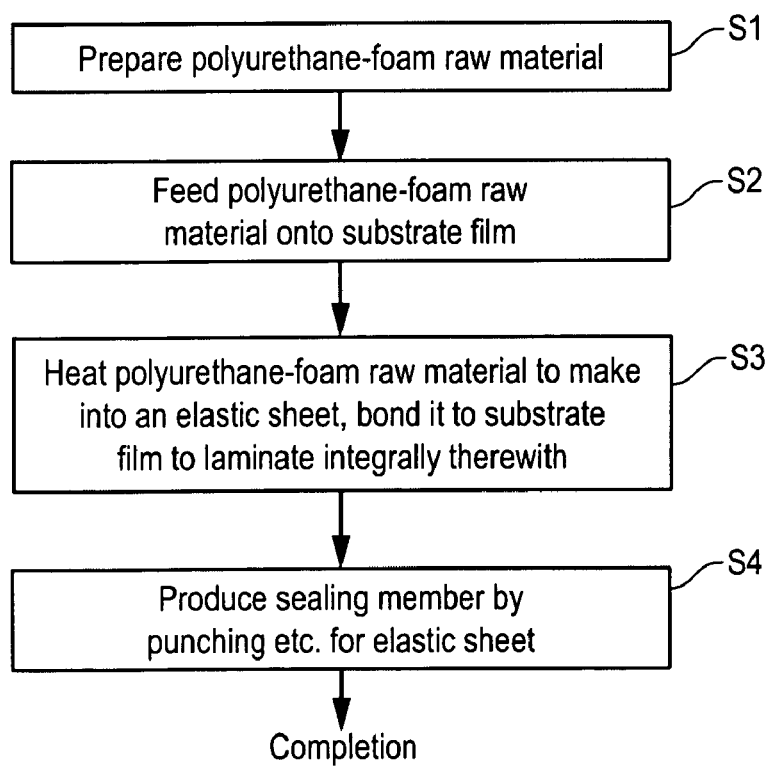
FIG. 3 is a flow chart showing a method of producing a sealing member of the embodiment.

The foams may be produced by mechanically mixing the reactive composition (i.e., isocyanate component, active hydrogen-containing component, froth-stabilizing surfactant, catalyst and other optional additives) with a froth-forming gas in a predetermined amount. As shown in FIG. 3, the frothed mixture (polyurethane-foam raw material) is continuously fed onto a substrate film 14, which is utilized also as transfer means in the production process. Substrate film 14 is also referred to herein as a first carrier or bottom carrier layer. Furthermore, the upper side of the frothed mixture is provided with a surface protective film 16, also referred to herein as a second or top carrier. Thus, the frothed reactive composition is sandwiched between the upper and lower two films 14, 16, and shaped into a sheet form with its surface protected from roughening and its thickness controlled, whereby foamed polyurethane sheet 12 is produced. This mechanical froth method and individual raw materials therefore, and the like are disclosed in detail in, for example, Japanese Patent Publication No. Sho 53-8735. A suitable process for mechanical frothing is also described in more detail below.

In another embodiment, the foam may be produced by a combination of mechanical frothing and blowing. In one manner of proceeding, the components for producing the low density foams, i.e., the isocyanate component, the active hydrogen containing component, catalyst, chemical blowing agents and any other desirable additives are first mixed together then subjected to mechanical frothing with air. Alternatively, the components may be added sequentially to the liquid phase during the mechanical frothing process. The gas phase of the froths is most preferably air because of its cheapness and ready availability. However, if desired, other gases can be used that are gaseous at ambient conditions and that are substantially inert or non-reactive with any component of the liquid phase. Other gases include, for example, nitrogen, carbon dioxide, and fluorocarbons that are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation may be conducted at standard pressures, for example pressures not greater than about 100 to about 200 pounds per square inch (689 to 1379 kilopascals). Readily available, mixing equipment can be used and no special equipment is necessary. The amount of inert gas beaten into the liquid phase is controlled by gas flow metering equipment to produce a froth of the desired density. The mechanical beating is conducted over an appropriate period to obtain the desired froth density, for example a few seconds in an Oakes mixer, or 3 to 30 minutes in a Hobart mixer. The froth as it emerges from the mechanical beating operation is substantially chemically stable and is structurally stable, but easily workable at ambient temperatures, e.g., about 10° C. to about 40° C.

After frothing, the reactive mixture is transferred at a controlled rate through a hose or other conduit to be deposited onto first carrier. For convenience, this first carrier may be referred to as "bottom carrier," and is generally a moving support that may or may not readily release the cured foam. A second carrier, also referred to herein as a "surface protective layer" or "top carrier" is placed on top of the froth. The top carrier is also a moving support that also may or may not readily release from the cured foam. The top carrier can be applied almost simultaneously with the froth. Before applying the top carrier, the foam can be spread to a layer of desired thickness by a doctoring blade or other suitable spreading device. Alternatively, placement of the top carrier may be used to spread the foam and adjust the frothed layer to the desired thickness. In still another embodiment, a coater can be used after placement of the top carrier to adjust the height of the foam. After application of the top carrier, the frothed foam is blown under the influence of a physical or chemical blowing agent.

In practice, the carriers can be played out from supply rolls and ultimately rewound on take-up rolls upon separation from the cured polyurethane foam. The selection of materials for the top and bottom carriers will depend on factors such as the desired degree of support and flexibility, the desired degree of releasability from the cured foam, cost, and the like considerations. Paper, thin sheets of metal such as stainless steel, or polymer films such as polyethylene terephthalate, silicone, or the like may be used. The material can be coated with a release coating. In one embodiment, the carrier may be coated with a material intended to be transferred to surface of the cured polyurethane foam, for example a polyurethane film that is releasable from the carrier. A fibrous web or other filler material may be disposed on the surface of the carrier, and thereby become ultimately incorporated into the cured foam. In another embodiment, the foam cures to one or both of the carriers. Thus, one or both carriers form part of the final product, instead of being separated from the foam and being rewound on a take-up roll. Alternatively, a conveyor belt can be used as the bottom carrier. The carriers may have a plain surface or a textured surface.

In a particular embodiment, the surface of the foam is provided with a skin layer. Sealing properties can be enhanced because adhesive properties to an object to be sealed can be improved thereby.

In a specific embodiment, in order to enhance the structural strength of an article such as sealing member 10 to improve the handling properties of the product, a substrate film 14 is cured to a foamed polyurethane sheet 12, i.e., is bound to the polyurethane sheet. As hereinafter described with respect to a production method, this substrate film 14 can also serve as a transfer means for the frothed reactive composition in a production apparatus 30. Therefore, the substrate film 14 preferably comprises any resin having low heat-shrinkable properties, such as polyethylene terephthalate (PET), the resin having a physical strength resistible to a tensile force applied by a roller machine 32, and resistance properties to heat applied by a heating means 38. In addition, a film comprising a resin such as polyolefin, polyester, polyamide, polyvinyl chloride can be also employed, though it is preferred to employ PET also in terms of cost in particular. Depending upon the quality of material, the thickness of a substrate film or bottom carrier 14 can be 10 to 500 micrometer, and preferably 25 to 125 micrometer. These thicknesses will not adversely affect the sealing properties of the article even when the substrate film 14 is bonded to a foamed polyurethane sheet 12.

The assembly of the carriers and foam layer (after optional blowing) is delivered to a heating zone for cure of the polyurethane foams. The temperatures are maintained in a range suitable for curing the foam, for example at about 90° C. to about 220° C., depending on the composition of the foam material. Differential temperatures can be established for purposes of forming an integral skin on an outside surface of the foam or for adding a relatively heavy layer to the foam.

After the foam is heated and cured, it can then be passed to a cooling zone where it is cooled by any suitable cooling device such as fans. Where appropriate, the carriers are removed and the foam can be taken up on a roll. Alternatively, the foam can be subjected to further processing, for example lamination (bonding using heat and pressure) to one or both of the carrier layers.

Figure 4:
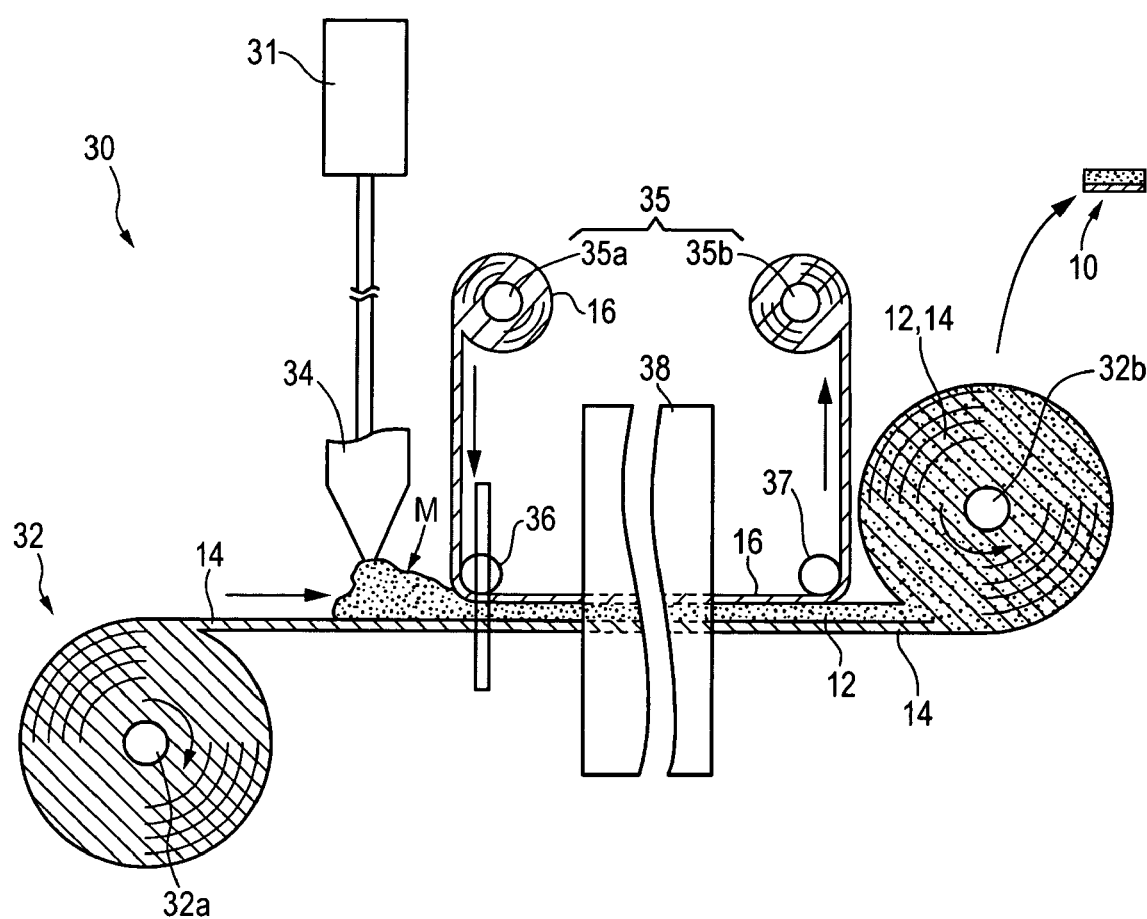
FIG. 4 is a schematic view showing one example of a production apparatus for producing a sealing member of the example.

A preferred example of an apparatus for producing an article comprising a foamed polyurethane sheet, for example a sealing member, and a method of producing the article using the production apparatus will now be hereinafter explained. As shown in FIG. 4, the production method of the foamed polyurethane sheet comprises the step S1 of providing and preparing a raw material, the step S2 of feeding and shaping the raw material, the heating step S3, and the final step S4. The foamed polyurethane sheet is preferably produced by means of a production apparatus 30 as shown in FIG. 4. This production apparatus 30 comprises a mixing section 31, a roller mechanism 32, a discharge nozzle 34, a surface-protecting mechanism 35, thickness-controlling means 36 such as a roller or knife-over-plate coater, and heating means 38 such as a tunnel-type of heating furnace. In the mixing section 31, a main raw material (polyisocyanate component and reactive hydrogen-containing component), various auxiliary materials and a foam-forming gas and the like are mixed with each other so as to prepare a reactive composition M using mechanical frothing. The roller mechanism 32 comprises a supply roll 32a and a product-collecting roll 32b. The supply roll 32a serves as transfer means for the reactive composition M, by which a substrate film 14, for example a PET film, is driven from a driving source (not shown). The discharge nozzle 34 feeds the reactive composition M onto the substrate film 14. The surface-protecting mechanism 35 comprises a supply roll 35a and a collecting roll 35b. The thickness-controlling means 36 (as shown, a roller) is positioned near the substrate film 14 at the site downstream of the supply roll 35a. Thus the supply roll 35a and the collecting roll 35b are driven by driving means (not shown), whereby a surface-protecting film 16 is removed from the upper surface of the substrate film 14, and rewound by the collecting roll 35b via the roller of the thickness-controlling means 36 and a guide roll 37. The surface-protecting film 16 can also comprise a PET film or different film, and passes between the reactive composition M fed onto the substrate film 14 and the thickness-controlling means 36, whereby the thickness-controlling means 36 is prevented from directly coming into contact with the reactive composition M in the side downstream of the discharge nozzle 34. The thickness controlling means 36 controls the reactive composition M to be a predetermined thickness on the side downstream of the discharge nozzle 34. The heating means 38 is provided at the side downstream of the thickness-controlling means 36. The reactive composition M is reacted and cured on a flat surface, though it may be reacted and cured as required in a shaping die or on a releasing paper or the like.

The roller mechanism 32 is a mechanism that feeds the substrate film 14 to a production line while applying a tensile force to the substrate film 14, and collects the resultant foamed polyurethane sheet. The supply roll 32a is wound with the substrate film 14, and delivers the substrate film 14 under control. The discharge nozzle 34 feeds the reactive composition M onto the substrate film 14 transferred under control, the upper end of which is connected with the mixing section 31. The step S1 of providing and preparing a raw material as carried out in the mixing section 31 is a step wherein the reactive composition M for the foamed polyurethane sheet 12 is provided from a main raw material and various auxiliary materials and mixed.

In this step, as described above, by means of the surface-protecting film 16, the thickness-controlling means 36 is prevented from coming into contact with the reactive composition M fed onto the substrate film 14. Furthermore, in a similar way to the substrate film 14, the surface-protecting film 16 preferably comprises any resin having low heat-shrinkable properties, such as PET, the resin having a smooth surface, having a physical strength resistant to a tensile force applied by the surface-protecting mechanism 35, and having resistance properties to heat applied by the heating means 38. Furthermore, after the reactive composition M has passed through the heating means 38 with its surface leveled, the surface-protecting film 16 in one embodiment is released from the surface of the foamed polyurethane sheet 12 which has been produced by heating and curing the reactive composition M. Therefore, a releasing agent such as a silicone material is previously applied to the contact area of the surface-protecting film 16 with the reactive composition M. A paper with a release coating may alternatively be used.

The thickness controlling means 36 shapes the reactive composition M discharged onto the substrate film 14 into a sheet material having a required thickness, and thus uses a roller in this example. When the reactive composition M has passed through this thickness controlling means 36, the step S2 of feeding and shaping the raw material is completed. When only mechanical frothing is used, the thickness of the foamed polyurethane sheet produced by heating and curing the reactive composition M is set by the thickness-controlling means. Thus, the reactive composition M before heating (curing), which is prepared according to the mechanical froth method, is not substantially different in thickness from the foamed polyurethane sheet after heating (curing). Thus, the cured foam that is produced from this reactive composition M has a thickness that is set by means of the thickness-controlling means 36. It is to be noted, however, that when both mechanical frothing and blowing is used, thickness controlling means 36 will set the initial thickness of the foam. The subsequent blowing of the cast foam will generally result in an increased thickness, and thus a cured foam of increased thickness.

When the reactive composition M has passed through the heating means 38, the heating step S3 is completed. In one embodiment, when the reactive composition M is heated and cured on the substrate film 14, the foamed polyurethane sheet 12 and the substrate film 14 effectively utilize the adhesion effect of the reactive composition M, whereby the foamed polyurethane sheet 12 is firmly bonded to the substrate film 14, i.e., integrally attached thereto by the curing of the reactive composition M while in contact with film 14. In the final step S4, a long foamed polyurethane sheet 12 produced by the individual steps S1 to S3 is obtained, and if necessary, it is punched out in the shape of a foamed polyurethane sheet, which is a final product, and furthermore, a final inspection is carried out. The foamed polyurethane sheet 12 may be rewound for collection by means of the product-collecting roll 32b, while a final inspection is carried out, so as to be shipped in the shape as it is. In such a production mode, the length of the foamed polyurethane sheet 12 is preferably 5 meters or more. In this case, the processing for providing a required shape for the long foamed polyurethane sheet 12 and processing such as taping and punching can be continuously carried out, whereby it can be expected that the cost of production is lowered due to an improvement in productivity.

Figure 5:
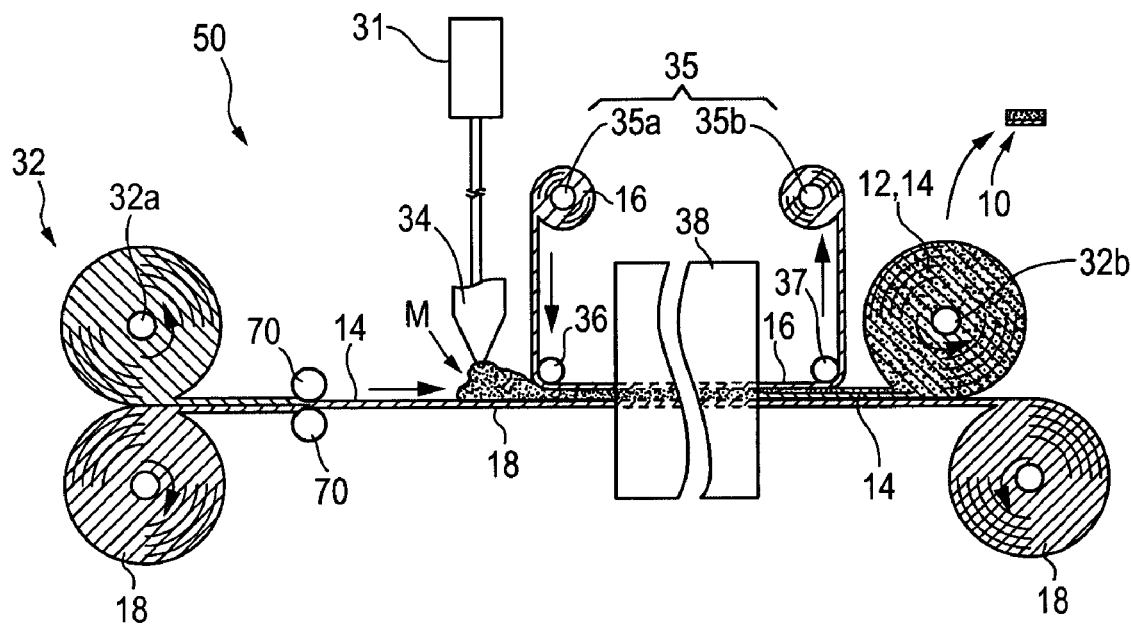
FIG. 5 is a schematic view showing one example of a production apparatus for producing a sealing member in a modified example.
Figure 6:
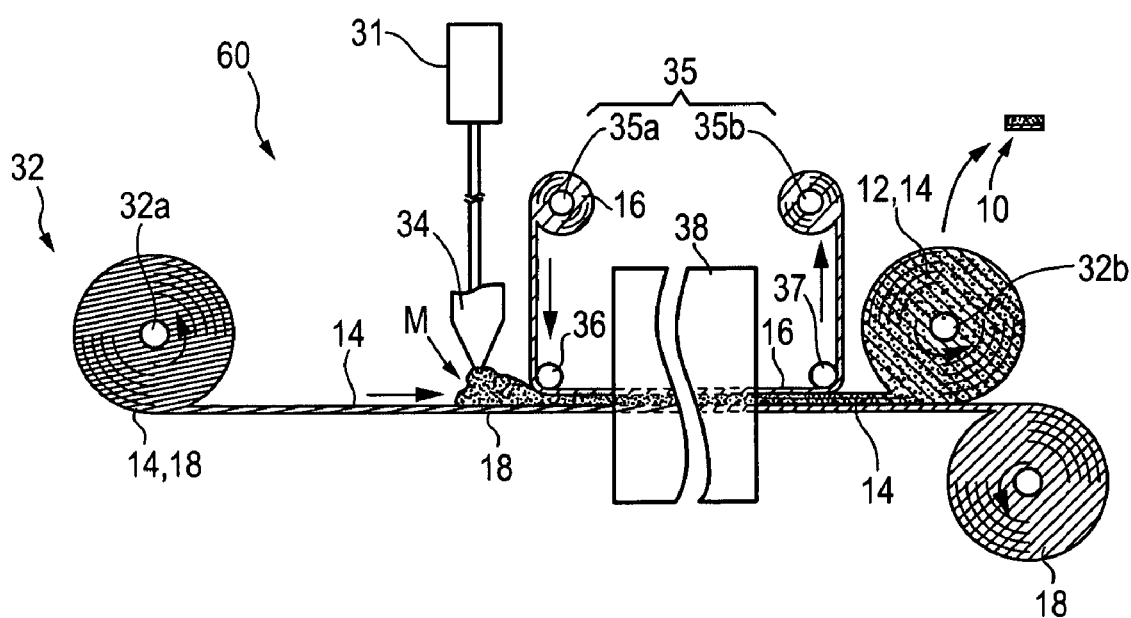
FIG. 6 is a schematic view showing one example of a production apparatus for producing a sealing member in another modified example.

In the example described above, a substrate film 14, which constitutes a part of the foamed polyurethane sheet, is directly fed into the production process, whereby the substrate film 14 is utilized also as a carrier film. However, the present invention is not limited thereto. For example, as in production apparatuses 50 and 60 as shown in FIGS. 5 and 6, a foamed polyurethane sheet can be produced by a method comprising the steps of separately preparing a carrier film 18, and laminating a substrate film 14 thereto by using pressure rolls 70 or the like (see FIG. 5) or otherwise previously laminating the substrate film 14 to the carrier film 18 such that the carrier film 18 can be easily released (see FIG. 6). In this case, the role as a carrier of transferring a reactive composition M with a tensile force applied can be separated, whereby the thickness of the substrate film 14 can be rendered thinner, and a reduction in cost can be expected due to the employment of a more inexpensive material.

Thus, in one embodiment, the thickness of the reactive composition M is controlled by means of the thickness-controlling means 36 via the surface-protecting film 16, whereby the thickness of the foamed polyurethane sheet is controlled. In addition, the surface of the reactive composition M is protected from roughening and the surface profile is leveled. However, the surface-protecting film 16 is not indispensable. For example, a releasing agent can be continuously provided on the surface of the roller of a thickness-controlling means 36 so as to enhance release properties between the roller and the reactive composition M, whereby the surface of the reactive composition M can be also protected from roughening. In this case, the surface-protecting film 16 is not necessary, whereby trouble during production is decreased, and thus a reduction in cost can be expected.

In addition, it is not necessary to provide reactive composition M to the upper side of the substrate film 14. For example, the following method can be employed, in which the method comprises the steps of: providing both a substrate film 14 and a surface-protecting film 16 downward from above, feeding a reactive composition M into a narrow gap between these two films 14 and 16 while controlling the thickness, and applying heat to the reactive composition M and curing the same while retaining the reactive composition M in the gap and making the best use of the viscosity of this reactive composition M itself. In this case, even if the viscosity of the reactive composition M is not sufficiently high, the reactive composition M is merely removed toward the lower sided to be transferred according to the production process, and furthermore, the thickness of the reactive composition M, i.e., the space to be filled therewith is substantially restricted by the substrate film 14 and the surface-protecting film 16, whereby no problem is caused in connection with the production process and the quality, and the degrees of freedom for installing a production apparatus can be enhanced.

When using mechanical frothing alone, the density of the foamed polyurethane sheet 12 thus derived is about 100 to about 250 kg/m$^3$, and the thickness is about 0.3 to about 3.0 mm. Thus, by attaining such a density, the 50% CLD is about 0.003 to about 0.025 MPa and the 75% CLD is about 0.02 to about 0.40 MPa. Furthermore, the dielectric constant measured of over a frequency of 10 kHz, 100 kHz and 1 MHz is about 1 to about 2.0.

The term "50% CLD" indicates a load which is required when the foamed polyurethane sheet 12 is physically compressed by 50%, that is, the hardness of the foamed polyurethane sheet 12 when physically compressed by 50%, while the term "75% CLD" indicates a load which is required when the foamed polyurethane sheet 12 is physically compressed by 75%, that is, the hardness of the foamed polyurethane sheet 12 when physically compressed by 75%. If these two values are higher than the preferred range mentioned above, the foamed polyurethane sheet 12 is excessively hard when physically compressed by 50% or 75%, and thus poor in flexibility, whereby the foamed polyurethane sheet 12 cannot sufficiently attain sealing properties. Furthermore, a load applied to a casing is excessively increased, and thus when the final product is used, the casing, or the like may cause deflections, cracks, chips, and/or other physical defects. On the other hand, if the values of 50% CLD and 75% CLD are lower than the preferred range mentioned above, it is difficult to shape the foamed polyurethane sheet 12.

It has been found that using mechanical frothing alone, it is difficult to produce a foam having a density of less than about 100 kg/m$^3$, because it is difficult to homogeneously mix a foam-forming gas with the resin raw material (reactive composition) in the production process. It has further been observed that bubbles for forming cells are not stably retained, and cellular roughening occurs, which makes the shape and/or size of the cell uneven, and the occurrence of voids will be caused. As a result, the development of satisfactory sealing properties will be inhibited. When the density of a foam produced using mechanical frothing alone is larger than about 250 kg/m$^3$, a preferred value of each of the 50% CLD, the 75% CLD, and the relative dielectric constant as described above will not be provided.

When the thickness is less than about 0.3 mm, it is difficult to attain the desired elasticity, and satisfactory sealing properties may not be attained. The upper limit of the thickness is about 3 mm, when use in an apparatus such as a portable telephone, wherein space-saving properties are required, is taken into consideration. Furthermore, when the interlocking structure of the casing of a portable telephone has, for example, a gap of about 0.25 mm and a gap of about 0.5 mm, a sealing member of the present invention, whose thickness is set to about 1 mm, is compressed to about 0.5 mm with sealing properties maintained when physically compressed by 50%, while it is compressed to 0.25 mm with sealing properties maintained when physically compressed by 75%, and thus it is a preferable sealing member.

It has unexpectedly been found that use mechanical frothing and a blowing agent, in combination with a top carrier, allows the production of polyurethane foams with advantageous properties over a wider range of densities and a wider range of thicknesses. Without being bound by theory, it is believed that the top carrier restricts diffusion of the gas generated by the blowing agent from the reactive composition. Foams formed using mechanical frothing and blowing, together with a top carrier, can have densities of about 50 to about 400 kg/m$^3$, specifically about 60 to about 250 kg/m$^3$, more specifically about 70 to about 200 kg/m$^3$, still more specifically about 70 to about 150 kg/m$^3$. Such foams also have a thickness of about 0.3 to about 13 mm, specifically about 0.3 to about 9 mm, more specifically about 0.3 to about 5 mm, and even more specifically about 0.3 to about 3 mm. The physical properties of such foams are excellent. For example, such foams can have a 50% CLD of about 0.003 to about 0.025 MPa and a 75% CLD of about 0.02 to about 0.40 MPa. Furthermore, the dielectric constant measured of over a frequency of 10 kHz, 100 kHz and 1 MHz is about 1 to about 2.0.

In particular, foams produced using mechanical and chemical frothing and a top carrier can have a thickness of about 0.3 to about 5 mm and a density of about 320 to about 400 kg/m$^3$. Alternatively, the foams can have thickness of about 0.5 to about 13 mm and a density of about 50 to about 250 kg/m$^3$. It is difficult to control the thickness of foams having a thickness of less than about 0.3 mm. Foams having a thickness of greater than about 13 mm are not useful as gaskets for small electronic devices such as cell phones. In foams having a density of less than about 50 kg/m$^3$, unacceptable voids may form. Foams having a density of greater than about 400 kg/m$^3$ do not have other properties that are desirable, for example 50% CLD. It is also difficult to control the thickness of foams having a thickness of less than about 5.0 mm and a density of less than about 320 kg/m$^3$.

The term "relative dielectric constant" as used herein means the value of a ratio of an electric flux density to an electric field density, divided by the vacuum dielectric constant, wherein the minimum of a relative dielectric constant is theoretically 1. That is, the sparser an object to be determined is (e.g., the structure of foam constituting an foamed polyurethane sheet 12 in the present invention), the lower its relative dielectric constant. Thus, in the present invention, the density of a foamed polyurethane sheet is lowered so as to increase its bubble fraction, whereby the relative dielectric constant when each frequency is 10 kHz, 100 kHz, and 1 MHz is about 1 to about 2.0. This is because when the relative dielectric constant is larger than about 2.0, the foamed polyurethane sheet is inferior in insulating performance, whereby satisfactory insulating characteristics cannot be exerted. The density of the structure of polyurethane foam constituting a foamed polyurethane sheet 12 can be essentially represented by the bubble fraction. Decreasing the density of the foam can increase this bubble fraction. Specifically, the bubble fraction is increased by increasing the mixing ratio of a foam-forming gas, for example, an inert gas such as nitrogen, as mixed into a reactive composition M. The bubble fraction is about 76% by volume or more.

In order to provide good mechanical properties to the foam, particularly good sealing properties for a foamed polyurethane sheet, the cellular diameter of the foam is about 20 to about 500 micrometers, preferably about 20 to about 300 micrometer. When this value is larger than about 500 micrometer, the foam is decreased in dust-proof performance and/or light-blocking effect. Furthermore, the smaller the cellular diameter of foam is, the higher the sealing properties of the foam. On the other hand, when the cellular diameter of the foam is less than about 20 micrometer, the control of the cellular diameter is difficult, and thus it is not practicable.

The invention is further illustrated by the following non-limiting examples.

EXAMPLES

In the following examples, the below polyols were used:

Polyether polyol-A: "GP-3000," trade name; Sanyo Chemical Industries, Ltd., (Average molecular weight is 3000, Hydroxyl value is 56.0 and EO content is 0%); and Polyether polyol-B: "FA-103", trade name; Sanyo Chemical Industries, Ltd., (Molecular weight is 3300, Hydroxyl value is 50.0 and EO content is 80%)

In addition, the measuring methods and conditions were as follows:

Density: The weight of each of the specimens was determined by means of an electronic force balance, and then the density was calculated using the calculation formula:

Density $(kg/m^3)$=[Weight (kg) of Specimen]/[Volume $(m^3)$ of Specimen].

50% CLD: A specimen was compressed to a thickness of 50% of the original thickness at a compression rate of 1 mm/min using a compression-testing machine, and then the load was determined. Thus the 50% CLD was calculated using the calculation formula:

50% CLD (MPa)=[Load (N) at 50% compression]/[Area (cm2) of Specimen].

75% CLD: A specimen was compressed to a thickness of 75% of the original thickness at a compression rate of 1 mm/min using a compression-testing machine, and then the load was determined. Thus the 75% CLD was calculated using the calculation formula:

75% CLD (MPa)=[Load (N) at 75% compression]/[Area $(cm^2)$ of Specimen].

Relative Dielectric Constant: A relative dielectric constant at a predetermined frequency was determined using a relative dielectric constant meter "HP4192A", trade name; Hewlett-Packard Development Company).

Example 1

Density, 50% CLD, and 75% CLD

One hundred parts by weight of polyether polyol-A were mixed with 3 parts by weight of a cross-linking agent (1,4-butanol), 20 parts by weight of a thickening agent (aluminum hydroxide), 0.1 part by weight of a metallic catalyst (Stannous Octoate), and 3 parts by weight of a foam stabilizer (a silicone material; including a diluting solvent) so as to obtain a mixture. Into this mixture, nitrogen (a foam-forming gas), and polyisocyanate (trade name "C-1130"; NIPPON POLYURETHANE INDUSTRY CO., LTD.; crude MDI NCO content: 31%) whose isocyanate index was set to 0.9 to 1.1 were blended at a flow rate of 0.1 NL/min so that the percentage described in Table 1 could be provided, and the blend was sheared to obtain a reactive composition ("foam reactive composition M"). This foam reactive composition M was fed from a discharge nozzle 34 onto a substrate film (made from PET) having a required thickness, which is continuously provided from a supply roll 32a in a state in which a tensile force is applied onto a roller machine 32, and the foam reactive composition M was set to a predetermined thickness by thickness-controlling means 36. Thereafter, the reactive composition M was heated by heating means 38 at a temperature of 150° C. to 200° C. for 1 to 3 minutes, whereby the reaction and curing of the reactive composition M was developed so as to obtain an foamed polyurethane sheet 12, and it was collected by means of a product-collecting roll 32b. Punching and other processing were applied to the resultant foamed polyurethane sheet 12 into a predetermined shape so as to obtain a foamed polyurethane sheet.

Then, from the sealing members of Examples 1-1 to 1-3, and Comparative Examples 1-1 and 1-2, the substrate films were released, whereby rectangular test specimens of a required thickness×150 mm×50 mm for determining a relative dielectric constant, and circular specimens of a required thickness×150 mm for determining a 50% CLD and a 75% CLD were obtained. With each of these specimens, the relative dielectric constant at each frequency of 10 kHz, 100 kHz and 1 MHz, and the 50% CLD (MPa) and the 75% CLD (MPa) were determined, and based on these determined results, the applicability as a sealing member of the present invention was evaluated.

The results of Example 1 are all listed in Table 1. From Table 1, it was confirmed that by setting the density to the range prescribed in the present invention, each of the 50% CLD and the 75% CLD is a value that is sufficient for sealing properties. Furthermore, it was confirmed that by setting the EO content to the range prescribed in the present invention, the relative dielectric constant at each frequency of 10 kHz, 100 kHz and 1 MHz is a low value in the range of 1 to 2.0.

TABLE 1

|  | Example 1-1 | Example 1-2 | Example 1-3 | Comp. Ex. 1-1 | Comp. Ex. 1-2 |
|---|---|---|---|---|---|
| Mixing Ratio of Foam-forming Gas (volume %) | 91.0 | 86.0 | 76.0 | 71.0 | 62.0 |
| Density (kg/m³) | 100 | 150 | 250 | 300 | 400 |
| EO Content (%) | 0 | 0 | 0 | 0 | 0 |
| Results |  |  |  |  |  |
| 50% CLD (MPa) | 0.004 | 0.005 | 0.025 | 0.036 | 0.060 |
| 75% CLD (MPa) | 0.030 | 0.039 | 0.320 | 0.480 | 0.750 |
| Relative Dielectric Constant 10 kHz | 1.46 | 1.54 | 1.88 | 2.18 | 2.73 |
| 100 kHz | 1.35 | 1.46 | 1.74 | 1.94 | 2.42 |
| 1 MHz | 1.25 | 1.40 | 1.64 | 1.80 | 2.20 |
| Overall evaluation as a sealing member | good | good | good | unacceptable | unacceptable |

Example 2

Determination of Effect of EO Content on Relative Dielectric Constant

One hundred parts by weight of polyether polyol-A and polyether polyol-B at a percentage listed in Table 2 were mixed with 3 parts by weight of a cross-linking agent (1,4-butanol), 20 parts by weight of a thickening agent (aluminum hydroxide), 0.1 part by weight of a metallic catalyst (Stannous Octoate), and 3 parts by weight of a foam stabilizer (a silicone material; including a diluting solvent) so as to obtain a mixture. Into this mixture, nitrogen (a foam-forming gas), and polyisocyanate (crude MDI, NCO content: 31%) whose isocyanate index was set to 0.9 to 1.1 were blended at a flow rate of 0.1 NL/min so that the percentage described in Table 2 could be provided, and the blend was sheared to obtain a reactive composition M. Thereafter, according to Example 1, test specimens for Example 2-1 and Comparative Examples 2-1 to 2-3 were produced, and the relative dielectric constant, the 50% CLD and the 75% CLD were determined.

The results of Example 2 are all listed in Table 2. From Table 2, it was confirmed that by setting the EO content to the range prescribed in the present invention, each of the relative dielectric constants at each frequency of 10 kHz, 100 kHz and 1 MHz is a low value in the range of 1 to 2.0.

TABLE 2

|  | Example 2-1 | Comp. Ex. 2-1 | Comp. Ex. 2-2 | Comp. Ex. 2-3 |
|---|---|---|---|---|
| Mixing Ratio of Foam-forming Gas (Volume %) | 76.0 | 76.0 | 76.0 | 71.0 |
| Density (kg/m³) | 250 | 250 | 250 | 300 |
| A/B* | 75/25 | 70/30 | 0/100 | 0/100 |
| EO Content (%) | 20 | 24 | 80 | 80 |
| Results |  |  |  |  |
| 50% CLD (MPa) | 0.025 | 0.026 | 0.026 | 0.038 |
| 75% CLD (MPa) | 0.340 | 0.330 | 0.300 | 0.460 |
| Relative Dielectric Constant 10 kHz | 1.95 | 2.05 | 2.10 | 2.50 |
| 100 kHz | 1.85 | 1.98 | 2.05 | 2.42 |
| 1 MHz | 1.75 | 1.85 | 1.96 | 2.30 |
| Overall Evaluation as a Sealing Member | good | unacceptable | unacceptable | unacceptable |

*A/B represents the weight ratio of Polyether polyol-A to Polyether polyol-B.

As described above, in a sealing member and a method of producing the same according to the present invention, a polyurethane-foam raw material as prepared by mixing a resin raw material and a foam-forming gas in a predetermined amount is used, and the density of the foamed polyurethane sheet is set in the range of 100 to 250 kg/M³, whereby the compression load deflection at 50% of the foamed polyurethane sheet is in the range of 0.003 to 0.025 MPa, and the compression load deflection at 75% thereof is in the range of 0.02 to 0.40 MPa. Consequently, a sealing member is achieved having sufficient sealing properties at a high compression ratio can be produced. Furthermore, the setting of the density to the above range provides the advantageous effect that the relative dielectric constant of the sealing member can be decreased. Accordingly, a casing is high in electric conductivity, and easily carries an electric current, and thus the sealing member can be suitably employed even for a casing wherein a disadvantage such as the occurrence of electromagnetic waves may be caused.

Example 3

The examples below reflect polyurethane foams produced from froth compositions, some of which contained water and some of which were devoid of water. For each foam, polyol, catalyst, and water (where used) were mixed and placed in a holding tank with agitation and under dry nitrogen. This mixture was then pumped at a controlled flow rate to a high shear mixing head of the Oakes type. The isocyanate component, surfactant and pigment mixture were also separately pumped into the mixing head at controlled flow rates and at the proper flow ratios relative to the polyols mixture flow rate. Flow meters were used to measure and adjust the flow rates of the various raw material streams. Dry air was introduced into the mix head using a gas flow rate controller to adjust the airflow rate so as to create froth densities of 10, 20, 30, 40, 50 and 60 pcf (160, 320, 481, 641, 801, and 961 kg/m³), respectively.

After mixing and foaming in the high shear mixer, the materials were pumped through a flexible hose and out through a rigid nozzle. The foams were then cast onto a coated release paper that had been dried by passing it through an infrared drier just prior to the point where the foam was introduced. This prevented any water that might have been in the paper from participating in the reaction. The release paper was 12 inches wide (30.5 cm) and was drawn through the machine at two controlled speeds, one at 5 feet per minute (FPM) (152 cm per minute) and the other at 15 FPM (457 cm per minute). The bottom layer of paper, cast foam, and top layer were then passed under a knife over plate (KOP) coater. The KOP was used to control the initial thickness of the final product to 100 mils (2.54 mm). The cast width of the foam layer was 8 to 10 inches (20 to 25.4 cm).

The coated release paper then passed through a curing section consisting of heated platens kept at 120° C. to 190° C. by a series of thermocouples, controllers and heating elements. A series of upper platens were kept at 220° C. The cured product then passed through an air-cooling section, a series of drive rollers and was wound up on a take-up roll.

Figure 7:
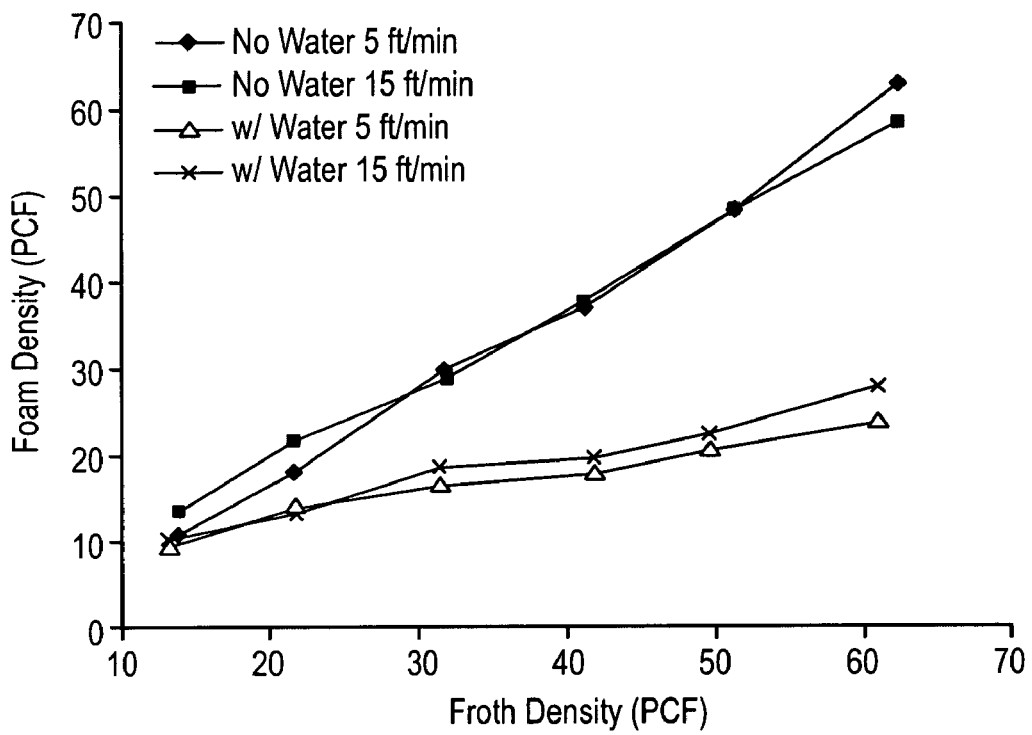
FIG. 7 is a graph showing the effect of the addition of water on the relationship between foam density and froth density.

FIG. 7 shows the densities of cured foams produced from the various froths, some of which contained water as well as some that did not contain any water. It can be clearly seen that foams produced from froths that did not contain any water have densities almost identical with the froths from which they were produced. For example, the foam having a density of 20 pcf (320 Kg/m³) was produced from froth devoid of water and having a density of 20 pcf (320 Kg/m³). The froths containing water, on the other hand, result in foams having significantly lower densities than the froths from which they were produced. For example, the froth containing water and having a density of 20 pcf (320 Kg/m³) results in polyurethane foam having a density of 12 pcf (192 Kg/m³) after curing. Thus it can be clearly seen that the use of water in the froth produces foams having a significantly lower density than those produced from froths containing no water.

Example 4

Figure 8:
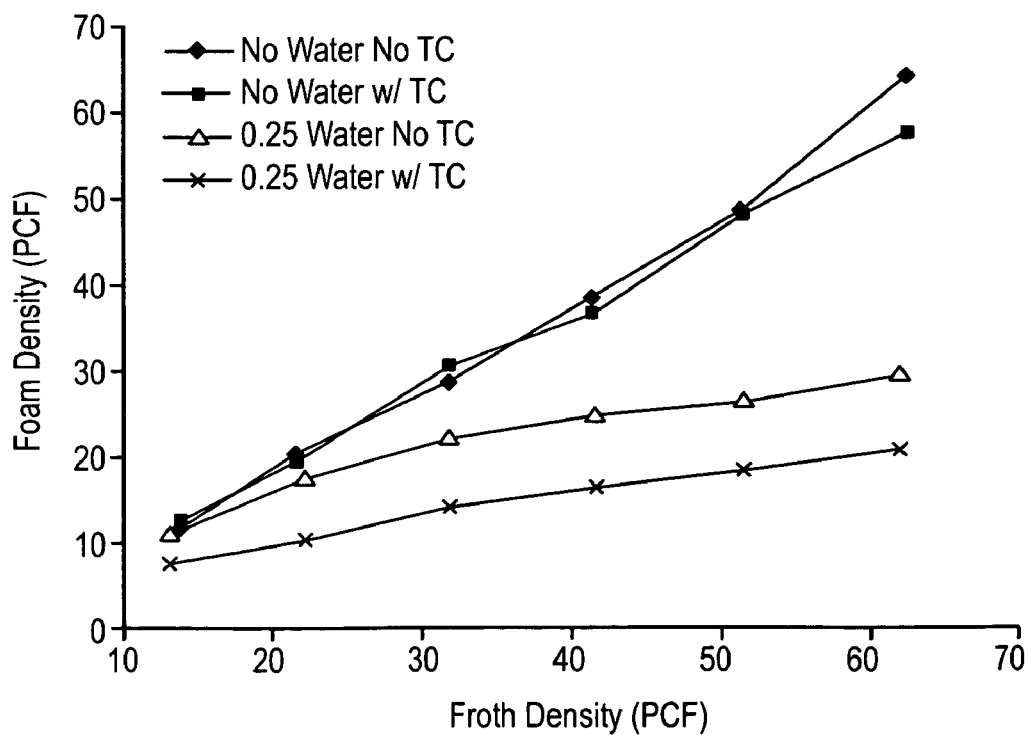
FIG. 8 is a graph showing the effect of the addition of water as well as the use of a top carrier on the relationship between foam density and froth density.

The data shown in FIG. 8 reflects the change in foam density with change in froth density for polyurethane foams having a thickness of 2.5 mm and produced from froth compositions containing 0.25 parts of water or devoid of water as indicated. In addition, some of the foams were produced using a top carrier (TC) and some were produced without the use of a top carrier (No TC). Each foam was produced substantially as described above.

It can be seen from FIG. 8 that foams produced from froths that did not contain water have densities almost identical with the froths from which they were produced. For example, the foams having a density of 20 pcf (320 Kg/m$^3$) were produced from froths devoid of water and having a density of 20 pcf (320 Kg/m$^3$). The presence of the top carrier appears to make no difference when water is not used in the froth. The froths containing water, on the other hand, yielded foams having significantly lower densities than the froths from which they were produced. The foams produced from the froth containing water and in the presence of a top carrier show the greatest reductions in density. For example, the froth containing water cured in the presence of a top carrier and having a density of 20 pcf (320 Kg/m$^3$) results in polyurethane foam having a density of 10 pcf (160 Kg/m$^3$) after curing. Thus, the use of water in the frothed mixture, along with a top carrier, produces foams having a significantly lower density than those produced from froths containing no water and having no top carrier.

Example 5

Tables 3 and 4 below illustrate the effect of using a combination of a chemical blowing agent (water) together with mechanical frothing, and cure in the presence of a top carrier. Formulations and procedures as described above may be used. Table 3 shows the effect of use of a combination of a chemical blowing agent (water) together with mechanical frothing, and cure in the presence of a top carrier. Table 4 illustrates the projected use of only mechanical frothing and curing in the presence of a top carrier.

In Tables 3 and 4, an "O" denotes that the foam is acceptable for use as a gasketing material, i.e., that the foam may be formed having a uniform thickness, and that the cell structure is acceptable for use in electronic devices such as cell phones. A "V" denotes that the thickness of the foam can be controlled to an acceptable level, but that one or more voids form in the foam. The presence of voids is less desirable from a customer standpoint. An "X" denotes that the thickness of the foam varies, and that one or more voids form in the foam.

TABLE 3

| Foam Density, | Foam Thickness, mm | | | | | | | | |
|---|---|---|---|---|---|---|---|---|---|
| Kg/m$^3$ | 0.2 | 0.3 | 0.5 | 1.0 | 1.5 | 3.0 | 5.0 | 9.0 | 13 |
| 40 | X | X | X | X | X | X | X | X | X |
| 50 | X | X | O | O | O | O | O | O | O |
| 70 | X | X | O | O | O | O | O | O | O |
| 100 | X | X | O | O | O | O | O | O | O |
| 150 | X | X | O | O | O | O | O | O | O |
| 200 | X | X | O | O | O | O | O | O | O |
| 250 | X | X | O | O | O | O | O | O | O |
| 320 | X | O | O | O | O | O | O | X | X |
| 400 | X | O | O | O | O | O | O | X | X |

TABLE 4

| Foam Density, | Foam Thickness, mm | | | | | | | | |
|---|---|---|---|---|---|---|---|---|---|
| Kg/m$^3$ | 0.2 | 0.3 | 0.5 | 1.0 | 1.5 | 3.0 | 5.0 | 9.0 | 13 |
| 40 | X | X | X | X | X | X | X | X | X |
| 50 | X | X | X | X | X | X | X | X | X |

TABLE 4-continued

| Foam Density, | Foam Thickness, mm | | | | | | | | |
|---|---|---|---|---|---|---|---|---|---|
| Kg/m$^3$ | 0.2 | 0.3 | 0.5 | 1.0 | 1.5 | 3.0 | 5.0 | 9.0 | 13 |
| 70 | X | X | X | X | X | X | X | X | X |
| 100 | X | X | X | X | X | V | V | V | V |
| 150 | X | X | O | O | O | O | O | O | O |
| 200 | X | X | O | O | O | O | O | O | O |
| 250 | X | X | O | O | O | O | O | O | O |
| 320 | X | O | O | O | O | O | O | X | X |
| 400 | X | O | O | O | O | O | O | X | X |

As used herein, the singular forms "a," "an," and "the" include plural referents unless the context clearly dictates otherwise. The endpoints of all ranges reciting the same characteristic or referring to a quantity of the same component are independently combinable and inclusive of the recited endpoint. All references are incorporated herein by reference. The terms "first," "second," and the like do not denote any order, quantity, or importance, but rather are used to distinguish one element from another. All references are incorporated herein by reference.

The present examples and embodiments are to be considered as illustrative and not restrictive and the invention is not to be limited to the details given herein, but may be modified within the scope and equivalence of the appended claims.

What is claimed is:

1. A method for producing a cured, low density polyurethane foam, the method comprising:
   mechanically frothing a reactive polyurethane-forming composition comprising an isocyanate-containing component, an active hydrogen-containing component reactive with the isocyanate-containing component, a blowing agent comprising water, a surfactant, and catalyst system, wherein the catalyst system provides for a delayed curing of the foam; and
   in a continuous process,
      casting the frothed reactive polyurethane-forming composition onto a moving first carrier;
      placing a second carrier on a side of the cast froth opposite the first carrier;
      blowing the froth with the second carrier in place; and
      curing the blown froth so as to provide a polyurethane foam layer having a compression load deflection at 50% of about 0.003 to about 0.025 MPa, a compression load deflection at 75% of about 0.02 to about 0.40 MPa, a density of about 50 to about 400 kg/m$^3$ and a thickness of about 0.3 to about 13 mm.

2. The method of claim 1, wherein the second carrier imparts a smooth surface finish to the cured polyurethane foam.

3. The method of claim 1, further comprising passing the first carrier, froth, and second carrier through a thickness adjusting means.

4. The method of claim 1, wherein the first carrier, the second carrier, or both are bonded to the cured polyurethane foam layer.

5. The method of claim 4, wherein the bonding occurs upon cure of the blown froth while in contact with the first carrier, second carrier, or both.

6. The method of claim 1, wherein the first carrier, the second carrier, or both comprises a layer that is releasable from the first carrier, the second carrier, or both, but that bonds to the frothed, blown reactive polyurethane foam layer upon cure; and further comprising removing the first carrier, second carrier or both from the cured polyurethane foam and the bonded releasable layer.

7. The method of claim 1, wherein the active hydrogen-containing component comprises a polyether polyol.

8. The method of claim 7, wherein the polyether polyol has the formula $R[(OCH_nH_{2n})_zOH]_a$, wherein R is hydrogen or a polyvalent hydrocarbon radical; a is 2-8, equal to the valence of R; n in each occurrence is 1-2; and z in each occurrence is 2 to about 200.

9. The method of claim 8, wherein the polyether polyol has an ethylene oxide content of about 20 wt. % or less, based on the weight of the polyol.

10. The method of claim 1, further comprising a chemical blowing agent, a physical blowing agent, or a combination thereof, in addition to water.

11. The method of claim 10, wherein the physical blowing agent is 1,1-dichloro-1-fluoroethane, 1,1-dichloro-2,2,2-trifluoro-ethane, monochlorodifluoromethane, 1-chloro-1,1-difluoroethane; 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, pentafluoroethane, methyl-1,1,1-trifluoroethylether, difluoromethyl-1,1,1-trifluoroethylether; n-pentane, isopentane, cyclopentane, or a combination comprising at least one of the foregoing blowing agents.

12. The method of claim 1, wherein the catalyst comprises a metal acetylacetonate.

13. The method of claim 1, wherein the cured polyurethane foam layer includes cells having average cell diameters of about 20 to about 500 micrometer.

14. The method of claim 1, wherein the relative dielectric constant of the cured polyurethane foam layer at each of the frequencies of 10 kHz, 100 kHz and 1 MHz is about 1 to about 2.0.

15. The method of claim 1, wherein the foam has a thickness of 0.3 to 5 mm and a density of about 320 to about 400 kg/m$^3$.

16. The method of claim 1, wherein the foam has a thickness of about 0.5 to about 13 mm and a density of about 50 to about 240 kg/m$^3$.

17. An article comprising the foam of claim 1.

18. The article of claim 17, in the form of a sealing member.

19. The method of claim 1, wherein one or both of the first carrier and the second carrier comprises a release layer on at least one side thereof, and the frothed reactive polyurethane-forming composition is contacted with one or both of the release layers on the first and second carriers.

* * * * *